United States Patent
Kawabata (10) Patent No.: US 11,168,991 B2
(45) Date of Patent: Nov. 9, 2021

(54) ROAD IDENTIFYING DEVICE, AND VEHICLE CONTROL SYSTEM

(71) Applicants: Hitachi Automotive Systems, Ltd., Hitachinaka (JP); Clarion Co., Ltd., Saitama (JP)

(72) Inventor: Akihiro Kawabata, Hitachinaka (JP)

(73) Assignees: Hitachi Automotive Systems, Ltd., Hitachinaka (JP); Clarion Co., Ltd., Saitama (JP)

( * ) Notice: Subject to any disclaimer, the term of this patent is extended or adjusted under 35 U.S.C. 154(b) by 217 days.

(21) Appl. No.: 16/346,156

(22) PCT Filed: Nov. 30, 2017

(86) PCT No.: PCT/JP2017/042945
§ 371 (c)(1),
(2) Date: Apr. 30, 2019

(87) PCT Pub. No.: WO2018/105469
PCT Pub. Date: Jun. 14, 2018

(65) Prior Publication Data
US 2020/0056894 A1    Feb. 20, 2020

(30) Foreign Application Priority Data
Dec. 9, 2016   (JP) .............................. JP2016-239191

(51) Int. Cl.
*G01C 21/32* (2006.01)
*G01C 21/36* (2006.01)
*G05D 1/00* (2006.01)

(52) U.S. Cl.
CPC ........... *G01C 21/32* (2013.01); *G01C 21/367* (2013.01); *G05D 1/0088* (2013.01)

(58) Field of Classification Search
None
See application file for complete search history.

(56) References Cited

U.S. PATENT DOCUMENTS 5,951,622 A     9/1999  Nomura
2003/0220735 A1  11/2003  Nimura
(Continued)

FOREIGN PATENT DOCUMENTS

CA       2 976 344 A1     8/2016
DE  10 2010 029 138 A1   11/2011
(Continued)

OTHER PUBLICATIONS

Lipson et al., "Driverless: Intelligent Cars and the Road Ahead", 2016, The MIT Press, p. 171-173 (Year: 2016).*
(Continued)

*Primary Examiner* — Tamara L Weber
(74) *Attorney, Agent, or Firm* — Crowell & Moring LLP (57) ABSTRACT

A problem of the present invention is to provide a road specifying device which estimates an appropriate own vehicle position even when autonomous driving maps are not prepared for all roads in a driving assisting function which can automate and assist part or all of a driving operation of a passenger, and correctly perform traveling control of the autonomous driving. The road specifying device according to the present invention specifies a road on which an own vehicle is traveling based on autonomous driving map data including road data, navigation map data including data which is the road data and whose contents partially overlaps that of the autonomous driving map data, and position information of the own vehicle whose position is measured by an external positioning system.

3 Claims, 8 Drawing Sheets

(56) References Cited

U.S. PATENT DOCUMENTS

| | | |
|---|---|---|
| 2013/0031049 A1 | 1/2013 | Watanabe et al. |
| 2016/0273925 A1 | 9/2016 | Maekawa et al. |
| 2017/0016731 A1* | 1/2017 | Koshiba ................. G01C 21/30 |
| 2019/0384294 A1* | 12/2019 | Shashua ............... G05D 1/0088 |

FOREIGN PATENT DOCUMENTS

| | | |
|---|---|---|
| JP | 9-197962 A | 7/1997 |
| JP | 10-122887 A | 5/1998 |
| JP | 11-328597 A | 11/1999 |
| JP | 2003-315055 A | 11/2003 |
| JP | 2004-354395 A | 12/2004 |
| JP | 2009-156940 A | 7/2009 |
| JP | 2016-48210 A | 4/2016 |
| JP | 2016-176698 A | 10/2016 |

OTHER PUBLICATIONS

Japanese-language Opposition issued in Japanese Application No. 2020-700253 dated Jun. 8, 2020 (40 pages).
International Search Report (PCT/ISA/210) issued in PCT Application No. PCT/JP2017/042945 dated Feb. 27, 2018 with English translation (three (3) pages).
Japanese-language Written Opinion (PCT/ISA/237) issued in PCT Application No. PCT/JP2017/042945 dated Feb. 27, 2018 (four (4) pages).
Extended European Search Report issued in European Application No. 17877844.5 dated Jul. 10, 2020 (10 pages).

\* cited by examiner

AUTONOMOUS DRIVING MAP

FIG. 5B

NAVIGATION MAP 61

FIG. 5C

ONLY AUTONOMOUS DRIVING MAP CANNOT MAKE IT POSSIBLE TO DECIDE THAT VEHICLE GOES DOWN TO LOCAL ROAD.

SUPPLEMENT NEARBY NAVIGATION MAP TO AUTONOMOUS DRIVING MAP TO USE IN COMBINATION

FIG. 5D

IT IS POSSIBLE TO DECIDE THAT VEHICLE IS ON LOCAL ROAD

FIG. 6A

ROAD DATA A

FIG. 6B

ROAD DATA N

→ TRAVELING ROUTE
▬▬ HIGHWAY
── LOCAL ROAD
----- VIRTUAL ROAD OBTAINED FROM NAVIGATION MAP

FIG. 7

| AUTONOMOUS DRIVING MAP MAINLY FOR CONTROL FUNCTION TARGET PORTION | | ITEM | | NAVIGATION MAP MAINLY FOR GUIDE FUNCTION TARGET PORTION (INCLUDING NARROW ROADS) | |
|---|---|---|---|---|---|
| LANE SPECIFICATION, JUNCTION, JUNCTION TRAJECTORY, AND FORWARD MONITORING | ◎ | LINK SHAPE | △ | FOR ENLARGED DISPLAY WITH EXAGGERATION | |
| SUBSTITUTED BY ABOVE | △ | ROAD SHAPE ROAD WIDTH | ○ | FOR SPECIFYING ROAD AND DISPLAYING DETAILS | |
| | × | WIDE AREA SHAPE | ○ | FOR DISPLAYING WIDE AREA | |
| LANE IS INCLUDED IN SOME CASES ONLY LAYER OF DETAILED SHAPE | ○ | CONNECTION INFORMATION | ○ | ROAD SEARCH (WITH LAYER) AND GUIDE | |
| THERE IS STRICT POSITION FOR CONTROL | ○ | SPEED | ○ | NO STRICT POSITION | |
| STOP CONTROL (HIGH POSITION ACCURACY) | ○ | TRAFFIC LIGHT | △ | FOR DISPLAYING WHETHER OR NOT THERE IS TRAFFIC LIGHT | |
| STOP CONTROL (HIGH POSITION ACCURACY) | ○ | STOP LINE | × | | |
| CONTROL FUNCTION DECISION (HIGH CHANGE POINT ACCURACY) | ○ | ROAD ATTRIBUTE | ○ | DISPLAY DECISION, NAME DISPLAY, AND DISPLAY WITH EXAGGERATION | |

FIG. 8

ROAD IDENTIFYING DEVICE, AND VEHICLE CONTROL SYSTEM

TECHNICAL FIELD

The present invention relates to a road specifying device and a vehicle control system, and relates to a road specifying device and a vehicle control system which specify, for example, a road on which an own vehicle is traveling on map data, causes, using information regarding the road, each equipment mounted in a vehicle to operate by using various driving control functions equipped with the vehicle, and automatically perform part or all of vehicle driving operations.

BACKGROUND ART

In recent years, a traveling control system which automatically performs part or all of driving operations of a vehicle and automatically drives the vehicle has been developed. As one example, there is known a driving assist control system which automates part of a driving operation of a passenger and assists driving such as inter-vehicle distance maintaining traveling control for keeping a fixed inter-vehicle distance to a preceding car which travels ahead while recognizing external environment of a vehicle, and traveling lane maintaining control for controlling traveling without deviating from a traveling lane of an own vehicle to reduce a burden of driving of the passenger. Furthermore, as a developed form of the driving assist control system, there is also studied an autonomous driving system which performs all driving operations without a passenger's operation, and automatically drives a vehicle.

On the other hand, there is a navigation unit as an information providing device for assisting driving. The navigation unit presents guide information related to traveling for a passenger. The navigation unit provides information related to a road which reaches a destination.

There is the following patent literature as related art which includes a plurality of navigation maps of different accuracy. This method uses two layers of reduced scales, yet is mainly characterized to overlap and display routes.

CITATION LIST

Patent Literature

PTL 1: JP H10-122887 A

SUMMARY OF INVENTION

Technical Problem

According to the above recent autonomous driving system, a control device mounted in a vehicle needs to decide how to travel. Therefore, the control device needs to have more detailed information (such as highly accurate and dense information such as information in units of traveling lanes) as map information unlike contents (information) presented to a passenger by a navigation unit, and needs an autonomous driving map (traveling control map) different from map information (navigation map) used as navigation.

However, preparing autonomous driving maps for all roads is very difficult due to a problem of cost, and, until the autonomous driving maps of all roads are prepared, it is necessary to use the above described navigation map and autonomous map in combination.

As described above, when the autonomous driving maps are not prepared for all roads, and when a vehicle is driving not on a road whose autonomous driving map is prepared but on a road which is the closest to the road, it is concerned to be decided that the vehicle is traveling on the road on the autonomous driving map by mistake. In this case, it is concerned that erroneous decision meets conditions which activate an autonomous driving function, and, as a result, it is concerned that the vehicle is controlled based on information different from that of the road on which the vehicle is actually traveling.

The present invention has been made in light of the above problem, and an object of the present invention is to provide a road specifying device and a vehicle control system which estimate an appropriate own vehicle position even when autonomous driving maps are not prepared for all roads in an autonomous driving system which can automatically perform part or all of a driving operation of a vehicle, and correctly perform traveling control of the autonomous driving.

Solution to Problem

To solve the above problem, the road specifying device according to the present invention specifies a road on which the own vehicle is traveling based on first map data including road data, second map data including data which is the road data and whose contents partially overlaps that of the first map data, and position information of the own vehicle whose position is measured by an external positioning system.

Advantageous Effects of Invention

According to the present invention, during traveling on a road which is not registered in first map data such as autonomous driving map data, it is possible to specify a correct traveling road, and use a correct current position and road information, and realize accurate autonomous driving of an autonomous driving device.

Further features related to the present invention will become apparent from the description and the accompanying drawings of the present disclosure. Furthermore, problems, configurations and effects other than the above will become apparent from the following embodiment.

DESCRIPTION OF EMBODIMENTS

Next, an embodiment of the present invention will be described. In addition, a word "traveling" used in the following description includes not only a state where a vehicle is moving at a predetermined speed but also a state where the vehicle waits for a traffic light and stops due to a traffic jam.

Figure 1:
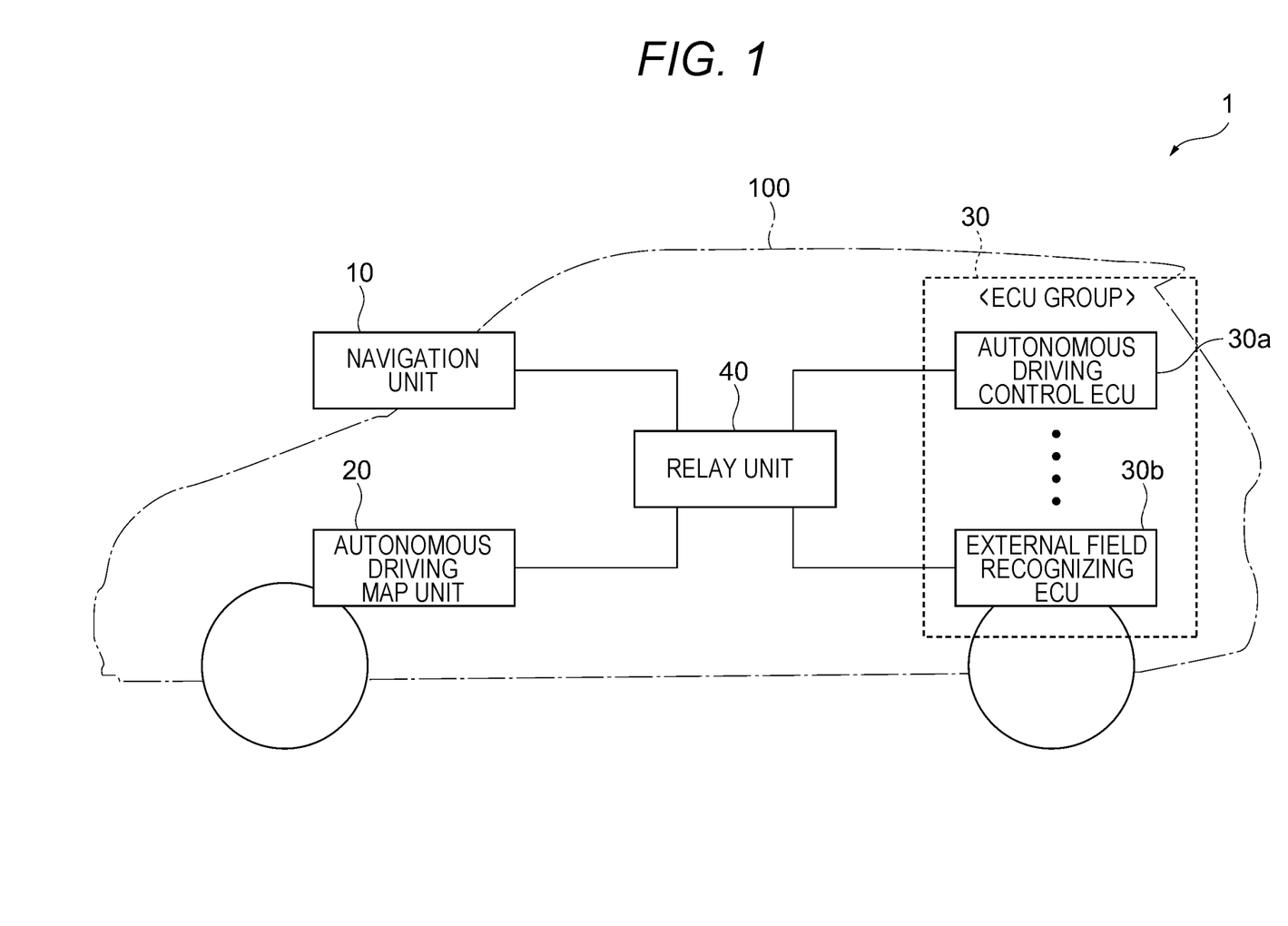
FIG. 1 is a block diagram illustrating an entire configuration of a first embodiment of a vehicle control system according to the present invention.
Figure 2:
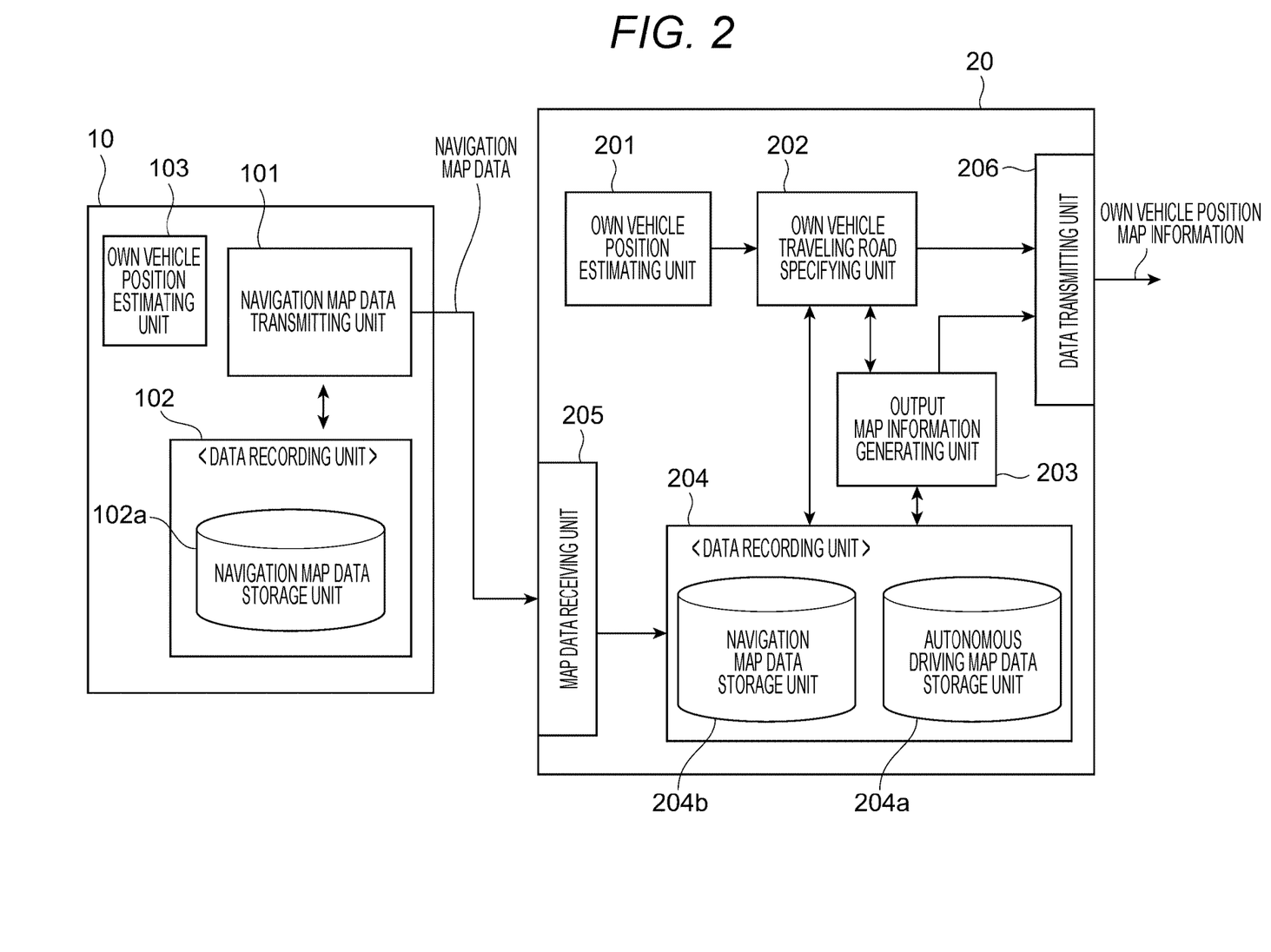
FIG. 2 is a block diagram illustrating internal configurations of a navigation unit and an autonomous driving map unit.

FIG. 1 is a block diagram illustrating an entire configuration of a first embodiment of a vehicle control system according to the present invention, and FIG. 2 is a block diagram illustrating an internal configuration of a navigation unit and an autonomous driving map unit.

As illustrated in FIG. 1, an in-vehicle processing system 1 according to the present embodiment includes a navigation unit 10 which is mounted on a vehicle 100, an autonomous driving map unit 20, and an ECU group 30 which includes a plurality of ECUs such as an autonomous driving control ECU 30a and an external field recognizing ECU 30b. The navigation unit 10 and the autonomous driving map unit 20 are connected with the ECU group 30 with a relay unit 40 interposed therebetween. The ECU group 30 controls traveling of the vehicle 100 based on map information inputted from the navigation unit 10 and the autonomous driving map unit 20 (traveling control device).

FIG. 2 is a block diagram illustrating internal configurations of the autonomous driving map unit and the navigation unit illustrated in FIG. 1.

The navigation unit 10 includes a navigation map data transmitting unit 101 which outputs navigation map data to an outside, and a data recording unit 102 which includes a navigation map data storage unit 102a. The navigation map data storage unit 102a stores navigation map data (second map data). The navigation unit 10 may include an own vehicle position estimating unit 103.

The autonomous driving map unit 20 includes an own vehicle position estimating unit 201 which estimates an own vehicle position, an own vehicle traveling road specifying unit (road specifying device) 202 which specifies a road on which an own vehicle is traveling based on the estimated own vehicle position and the autonomous driving map data, an output map information generating unit 203 which creates map information transmitted to the outside of the autonomous driving map unit 20, and a data recording unit 204 which includes an autonomous driving map data storage unit 204a which stores autonomous driving map data (first map data), and a navigation map data storage unit 204b which stores map data obtained from the navigation unit 10.

The own vehicle position estimating unit 201 is connected with a satellite information receiving device such as an unillustrated GPS, and sensors such as a gyro and an acceleration sensor. These satellite information receiving device and the sensors such as the gyro constitute an external positioning system, and measures the position of the own vehicle. Furthermore, the own vehicle position estimating unit 201 obtains position information of the own vehicle whose position is measured by the external positioning system. In the present embodiment, the own vehicle position estimating unit 201 obtains a coordinate value of a WGS-84 coordinate system calculated by GNSS positioning as the position information of the own vehicle.

Furthermore, the autonomous driving map unit 20 includes a map data receiving unit 205 which receives map data from an outside of the unit, and a data transmitting unit 206 which transmits information to the outside of the unit. The map data receiving unit 205 can receive navigation map data from the navigation unit 10. The data transmitting unit 206 transmits the position information of the own vehicle obtained by the own vehicle position estimating unit 201 and the own vehicle traveling road specifying unit 202, and map information generated by the output map information generating unit 203 based on this position information of the own vehicle to the outside of the unit.

Figure 7:
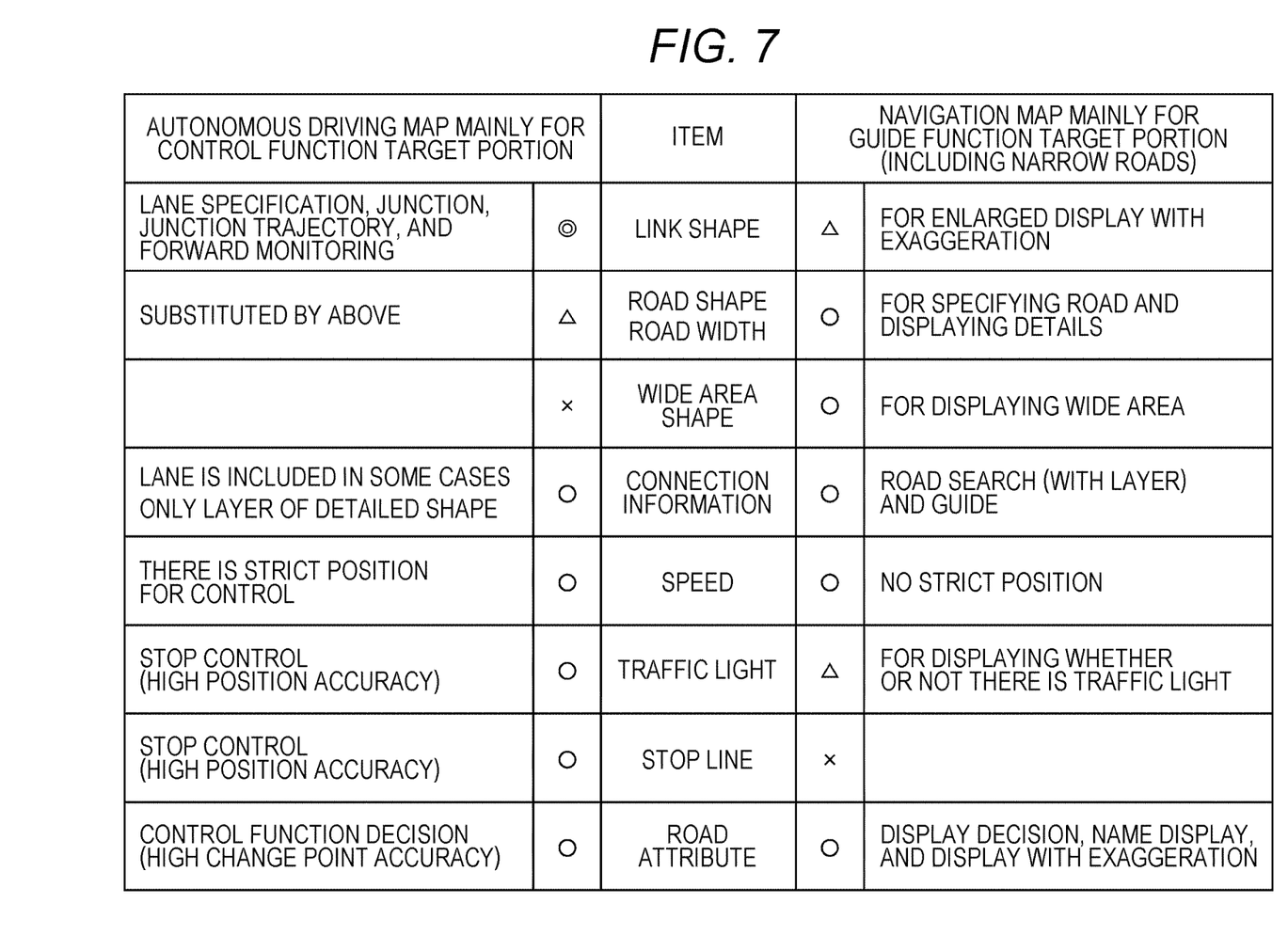
FIG. 7 is a view illustrating a specific example of data of the autonomous driving map data and the navigation map data.

FIG. 7 is a view illustrating a specific example of data of the autonomous driving map data and the navigation map data. The autonomous driving map data and the navigation map data differ in content and quality as illustrated in, for example, FIG. 7.

The autonomous driving map data is mainly for a control function target portion, and includes road data which is necessary to autonomously drive the own vehicle. On the other hand, the navigation map data is mainly for a guide function target portion (including narrow roads), and includes road data which is necessary to guide a route for the passenger. Both of the autonomous driving map data and the navigation map data include the road data, yet have contents which meet respective purposes of use and partially overlap.

Figure 3:
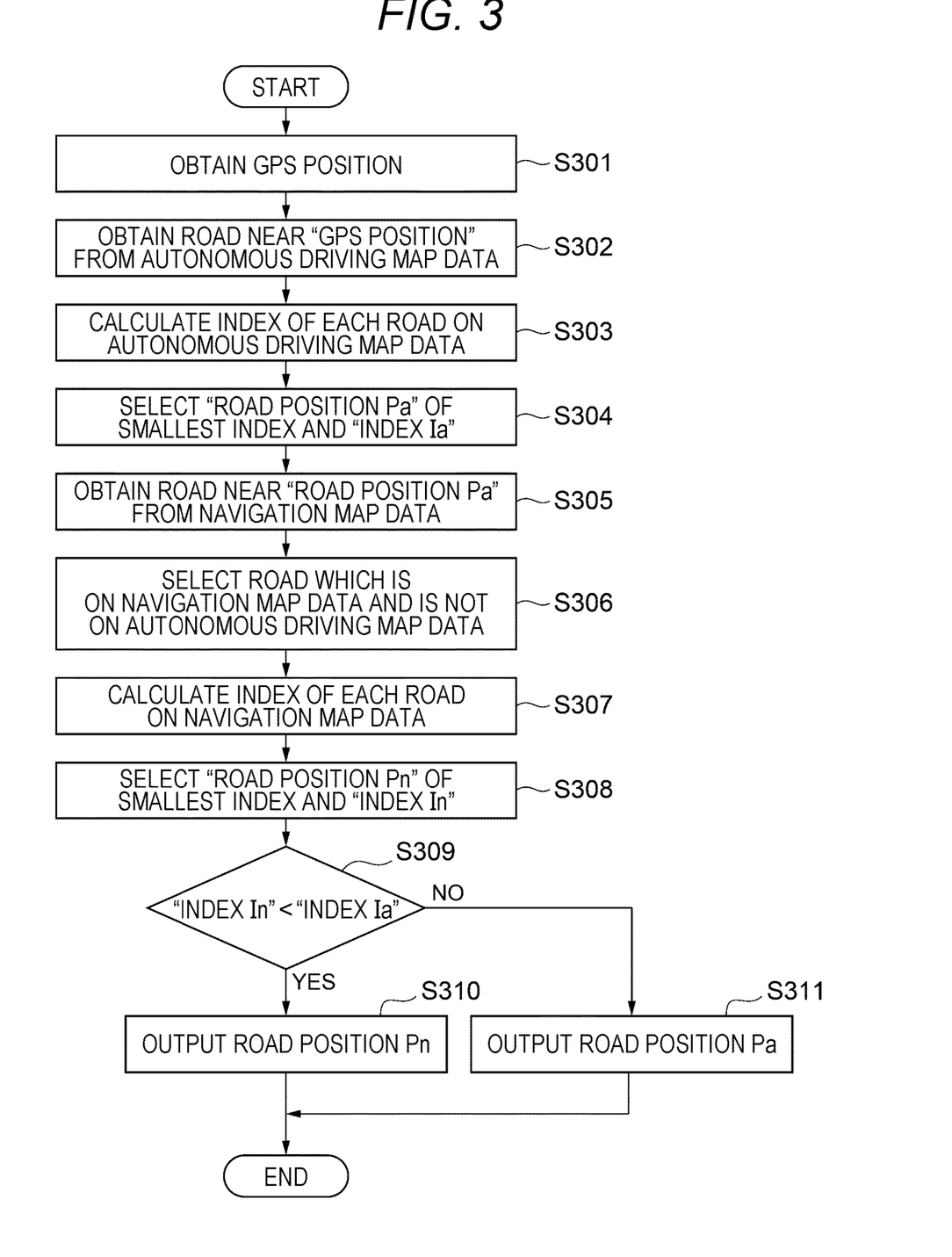
FIG. 3 is a flowchart for explaining a series of processing of the autonomous driving map unit.

Next, an example of a series of a processing flow of the own vehicle traveling road specifying unit 202 according to the present embodiment will be described with reference to FIGS. 3 and 4. FIG. 3 is a flowchart for explaining a series of processing of the autonomous driving map unit, and FIG. 4 is a schematic explanatory view for schematically explaining a series of processing of the autonomous driving map unit.

First, an own vehicle position (GPS position) is obtained from GPS information (S301). The GPS position is position information of the own vehicle whose position is measured by the external positioning system, and is obtained from the own vehicle position estimating unit 201 (own vehicle position information obtaining unit).

Next, data of a road near the GPS position is obtained from the autonomous driving map data (S302). More specifically, processing of extracting the road near the own vehicle from the autonomous driving map data by using the GPS position, and obtaining data of the extracted road is performed (first road data obtaining means).

Furthermore, an index of each road on the autonomous driving map data is calculated (S303). The index is a value calculated based on a difference between a plurality of road positions and azimuths on the map near the GPS position, and a GPS position and azimuth, and is an index which indicates a likelihood of road selection. Each value of a plurality of roads which is candidates is compared as one example of an index calculating method, and a smaller value is selected as the index. In a case of FIG. 4(A), "a position Pa of a road A" of the smallest index near the GPS position and an "index Ia" are selected (S304).

The index indicates the likelihood that the own vehicle is traveling on a corresponding road, and is used by a map matching technique of selecting a (the most likely) road of the highest probability at which the own vehicle is located among each road. The index value can be calculated according to, for example, following equation (1).

[Mathematical Formula 1]

$$\text{Index value} = \frac{\left(\begin{array}{c}\text{distance between own vehicle}\\ \text{position and road line segment}\end{array}\right)^2}{\left(\begin{array}{c}\text{error of road position} +\\ \text{error of estimated position}\end{array}\right)^2} + \frac{\left(\begin{array}{c}\text{difference between own vehicle}\\ \text{azimuth and road azimuth}\end{array}\right)^2}{\left(\begin{array}{c}\text{error of road azimuth} +\\ \text{error of estimated azimuth}\end{array}\right)^2} \quad (1)$$

Figure 8:
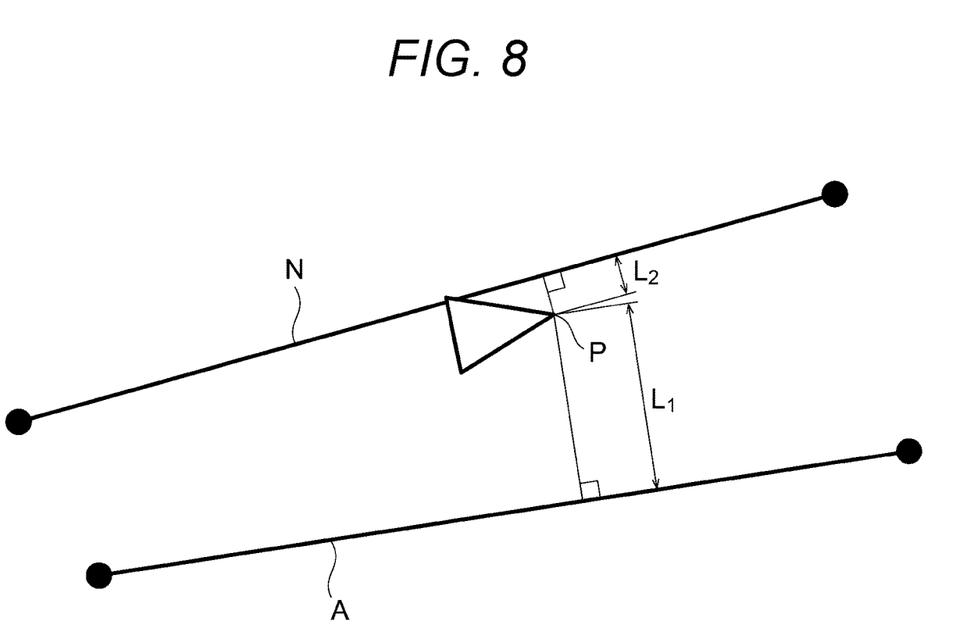
FIG. 8 is a view illustrating one example of a method for calculating an index value used for map matching.

A distance between the own vehicle position and a road line segment in equation (1) is a perpendicular distance as illustrated in, for example, FIG. 8. FIG. 8 illustrates that a distance between a road A and an own vehicle position P on the autonomous driving map data is L1, and a distance between a road N and the own vehicle position P on the navigation map data is L2. Furthermore, an error of a road position and azimuth is a standard deviation of an error which map data uniquely has, and an error of an estimated position and azimuth is a standard deviation in a case where the own vehicle position is estimated. The index value is a probability index for a statistical test method which is called a chi-squared distribution without a unit, and a smaller index value indicates a higher probability that the own vehicle is on a corresponding road.

In this regard, processing of calculating a first index indicating a likelihood that the own vehicle is traveling on a road about which the autonomous driving map data includes data is performed. More specifically, indices indicating likelihoods that the own vehicle is traveling are calculated for all roads extracted in S302. Furthermore, the most likely index among the calculated indices is selected as a first index, and the first road having the first index, and an own vehicle position and an own vehicle azimuth on the road of the first road are selected (first index calculating means). In an example illustrated in FIG. 4(A), the index Ia is selected as the first index, and the road A having the index Ia and the position Pa and the azimuth on the road of the road A are selected from the autonomous driving map data.

Figure 4A:
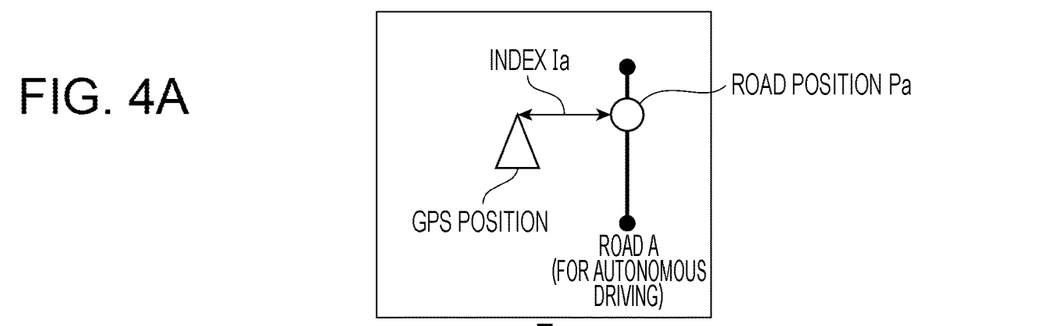
FIGS. 4A to 4D are schematic explanatory views for schematically explaining a series of processing of the autonomous driving map unit.
Figure 4B:
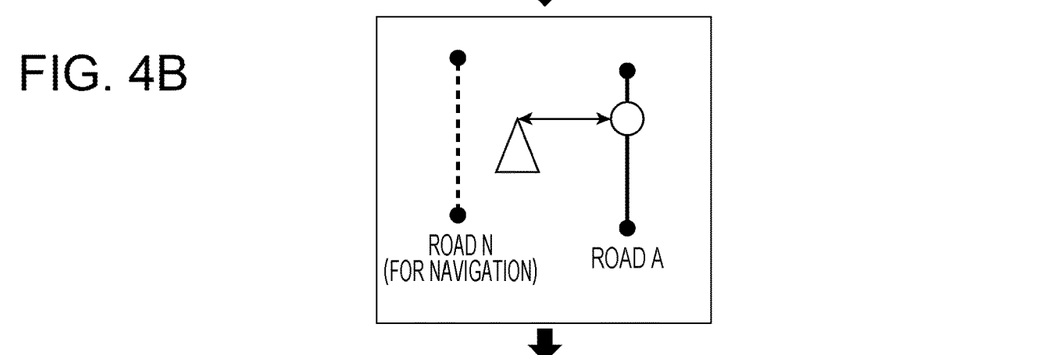

Next, road information near "the position Pa of the road A" is obtained from the navigation map of the navigation unit 10 (S305). As a result, as illustrated in FIG. 4(B), a road which is on the navigation map data and is not on the autonomous driving map data is selected (S306). Indices are calculated likewise for each road of the navigation map data selected in S306 (S307).

In this regard, a road near the own vehicle is extracted from the navigation map data by using the information of the position Pa selected in S304, and data of the extracted road is obtained (second road data obtaining means). Furthermore, a road about which only the navigation map data includes data, i.e., a road about which the autonomous driving map data does not include data is selected from all the extracted roads (road selecting means).

Figures 6A, 6B:
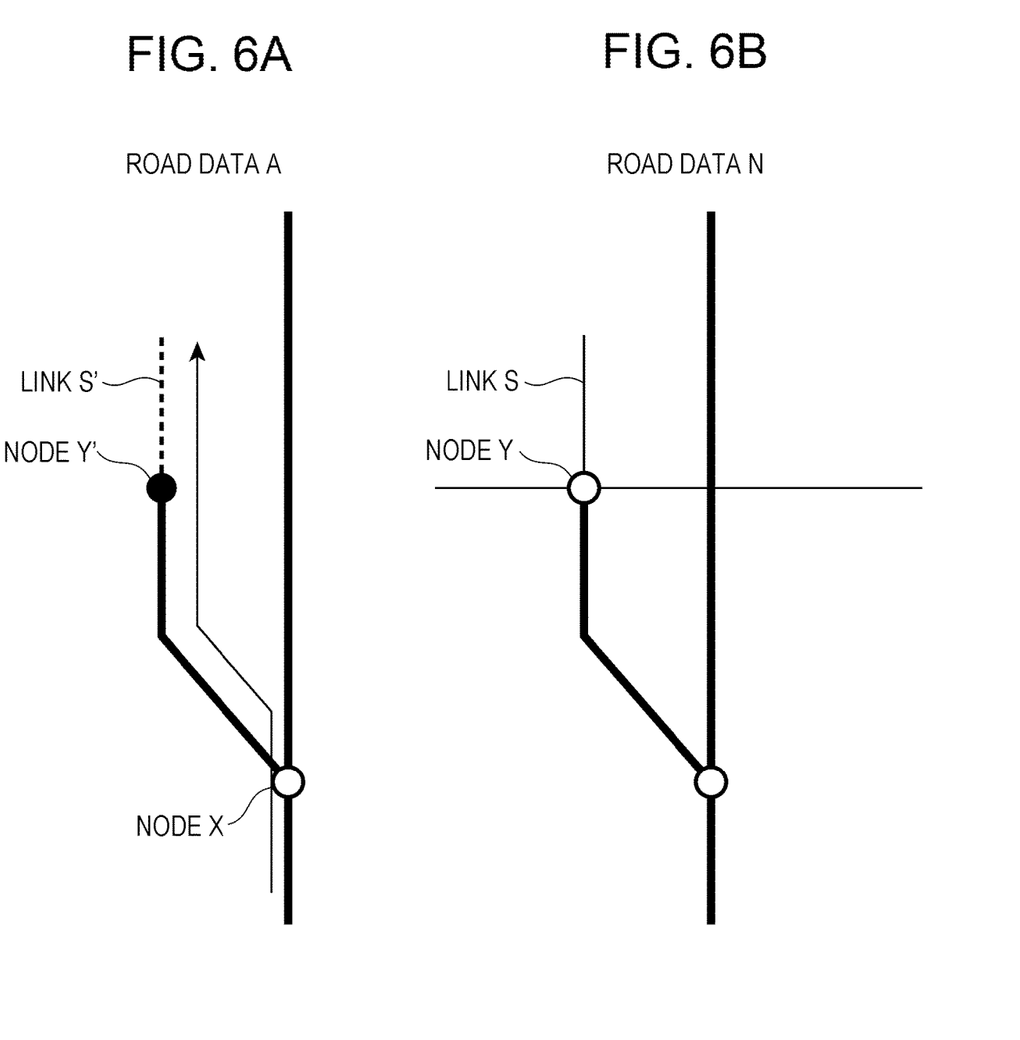
FIGS. 6A and 6B are views for explaining a specific example where a node Y' and a link S' are provided on autonomous driving map data based on navigation map data.

In this case, when a road connected by a node Y on the navigation map illustrated in FIG. 6(B) is generated, a link S' is provided by being connected to a node Y' virtually provided on the autonomous driving map data illustrated in FIG. 6(A). By so doing, when there is a road which is not actually connected, it is possible to prevent this road from being chosen by mistake.

Figure 4C:
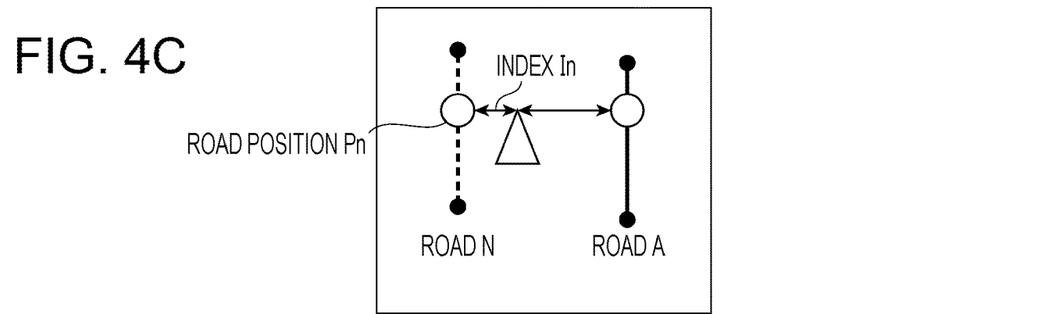
Figure 4D:
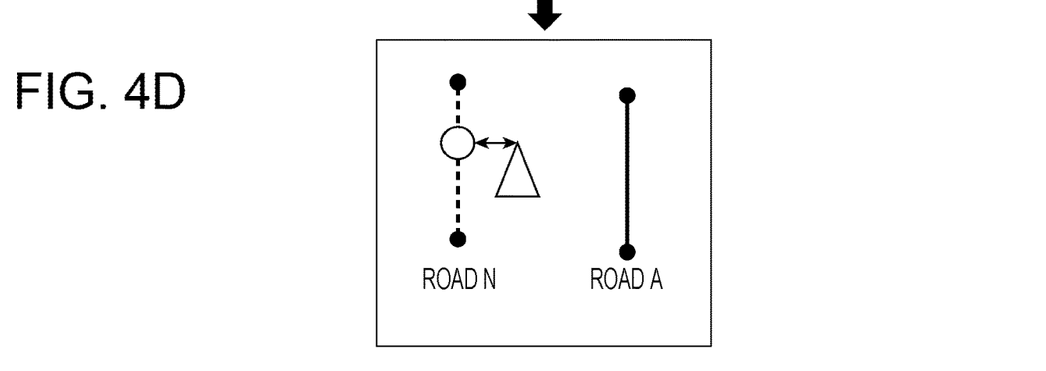

Furthermore, as illustrated in FIG. 4(C), "a position Pn of a road N" of the smallest index, and an "index In" are selected (S308). In this regard, indices indicating likelihoods that the own vehicle is traveling are calculated for all roads selected in S306. Furthermore, the most likely index among the calculated indices is set as a second index, and a second road having the second index, and an own vehicle position and an own vehicle azimuth on the road of the second road are selected (second index calculating means). In an example illustrated in FIG. 4(C), the index In is selected the second index, and the road N having the index In and the position Pn and the own vehicle azimuth on the road of the road N are selected from the navigation map data.

Next, the selected "index Ia" and "index In" are compared (S309). As a result, if a value of the "index value In" is smaller than that of the "index Ia", the smaller index is more likely, and a traveling position of the own vehicle is outputted as the "road position Pn" as in FIG. 4(D) (S310). If the value of the "index Ia" is smaller than that of the "index In", the traveling position of the own vehicle is outputted as the "road position Pa" (S311). That is, when the "index In" is more likely than the "index Ia" upon comparison between the "index Ia" and the "index In", it is decided that the own vehicle is traveling on the road N (deciding unit).

The output in S310 or S311 is transmitted as own vehicle position map information from the data transmitting unit 206 of the autonomous driving map unit 20 to the autonomous driving control ECU 30a. The autonomous driving control ECU 30a decides that the own vehicle is traveling on the road N of the navigation map data by using the own vehicle position map information and is located at the position Pn of the road N, and performs autonomous driving control. Consequently, it is possible to prevent erroneous decision that the own vehicle is located at the position Pa of the road A, and prevent autonomous control from being performed according to an attribute of the road A.

FIG. 5 illustrates a situation as to whether or not the present embodiment is applied.

Figure 5A:
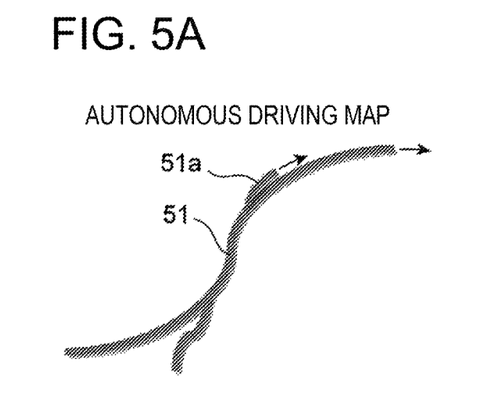
FIGS. 5A to 5D are schematic explanatory views for schematically explaining an effect of a series of processing of the autonomous driving map unit.
Figure 5B:
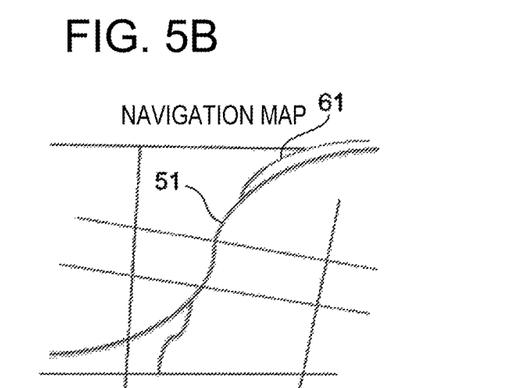

FIGS. 5(A), (C) and (D) are autonomous driving maps, and FIG. 5(B) is a navigation map indicating the same place. FIGS. 5(A) and (C) illustrate only a highway 51, and FIGS. 5(B) and (D) illustrate both the highway 51 and a local road 61.

Figure 5C:
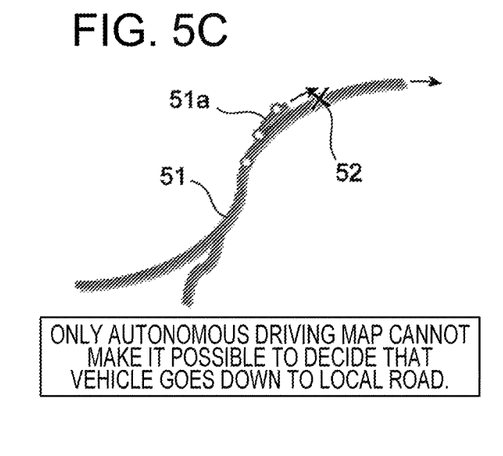
Figure 5D:
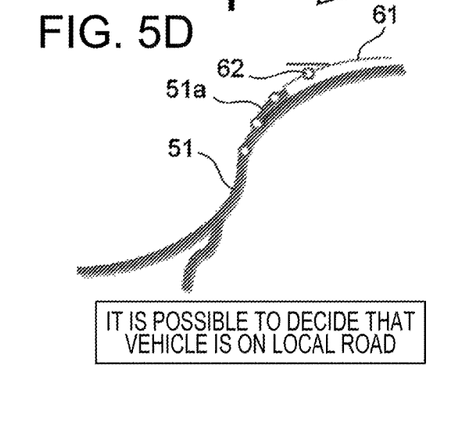

If the own vehicle goes down from the highway 51 in a state where there is only the autonomous driving map data in FIG. 5(A), the own vehicle passes a junction 51a as in FIG. 5(C), and is traveling at a position away from the highway 51 on the autonomous driving map data. Hence, it is conventionally concerned that an own vehicle position is estimated by mistake as a position 52 of a "x" symbol in FIG. 5(C) from previous index information.

By contrast with this, according to the present embodiment, the navigation map data is supplemented and used in combination as in FIG. 5(B). Even when the own vehicle travels at a position 62 without a road on the autonomous driving map data as in FIG. 5(D), it is possible to correctly estimate the own vehicle position at the position 62 outside the road on the autonomous driving map data.

Furthermore, in the above-mentioned embodiment, the own vehicle position estimating unit 201 in the autonomous driving unit chooses a correct road by using the navigation map data. However, when there is the own vehicle position estimating unit 103 in the navigation unit 10, there may be also considered a method where the own vehicle position estimating unit 201 of the autonomous driving map unit 20 uses a result of this processing.

The embodiment of the present invention has been described in detail. However, the present invention is not limited to the above embodiment, and allows various design changes without departing from the spirit of the present invention recited in the claims. For example, the above embodiment has been described in detail to describe the present invention for ease of understanding, and is not necessarily limited to those including all described components. Furthermore, part of a configuration of a certain embodiment can be replaced with a configuration of the other embodiment, and the configuration of the other embodiment can be also added to the configuration of the certain embodiment. Furthermore, the other configuration can be added to, deleted from or replaced with part of the configuration of each embodiment.

REFERENCE SIGNS LIST 1 in-vehicle processing system
10 navigation unit
20 autonomous driving map unit
30 ECU group
40 relay unit
101 navigation map data transmitting unit
102 data recording unit
102a navigation map data storage unit
201 own vehicle position estimating unit
202 own vehicle traveling road specifying unit
203 output map information generating unit
204 data recording unit
204a autonomous driving map data storage unit
204b navigation map data storage unit
205 map data receiving unit
206 data transmitting unit

The invention claimed is:

1. A road specifying device, which specifies a road on which an own vehicle is traveling based on:

first map data including road data;

second map data including data which is the road data and contents of the data partially overlaps contents of the first map data;

position information of the own vehicle whose position is measured by an external positioning system, an own vehicle position information obtaining unit which obtains position information of the own vehicle whose position is measured by the external positioning system;

first road data obtaining means which extracts a road near the own vehicle from the first map data by using the position information of the own vehicle, and obtains data of the extracted one or more roads;

first index calculating means which calculates for the each of all the extracted roads an index indicating a likelihood that the own vehicle is traveling, selects a most likely index as a first index from the calculated indices, and selects a first road including the first index and an own vehicle position on a road of the first road;

second road data obtaining means which extract a road near the own vehicle from the second map data by using information of the own vehicle position on the selected road, and obtains data of the extracted road;

road selecting means which selects a road about which only the second map data includes the data and about which the first map data does not include the data from all the extracted roads;

second index calculating means which calculates for each of all the selected roads an index indicating a likelihood that the own vehicle is traveling, set a most likely index as a second index from the calculated indices, and selects a second road including the second index and an own vehicle position on a road of the second road; and a deciding unit which, decides that the own vehicle is traveling on a road corresponding to a most probable index between the first index and the second index upon a comparison between the first index and the second index.

2. The road specifying device according to claim 1, wherein the first map data is autonomous driving map data, and the second map data is navigation map data.

3. A vehicle control system comprising:

the road specifying device according to claim 1; and a traveling control device which controls traveling of the own vehicle based on data of a road which has been specified by the road specifying device and on which the own vehicle is traveling.

* * * * *